United States Patent [19]
Vryland

[11] 3,934,395
[45] Jan. 27, 1976

[54] CABLE STRANDING APPARATUS
[75] Inventor: George W. Vryland, Richmond, Va.
[73] Assignee: Reynolds Metals Company, Richmond, Va.
[22] Filed: Dec. 19, 1974
[21] Appl. No.: 534,639

[52] U.S. Cl. ............................................. 57/13; 57/6
[51] Int. Cl.² ........................ D07B 3/06; D07B 3/00
[58] Field of Search ............... 57/3, 6, 9, 10, 13–17, 57/19, 92, 93, 106, 113, 166

[56]  References Cited
UNITED STATES PATENTS

| | | | |
|---|---|---|---|
| 2,360,783 | 10/1944 | MacCreadie | 57/13 |
| 3,727,390 | 4/1973 | Schwarz | 57/13 |
| 3,736,739 | 6/1973 | Walter | 57/13 |
| 3,872,658 | 3/1975 | Ostermann | 57/13 |

Primary Examiner—Donald E. Watkins
Attorney, Agent, or Firm—Glenn, Palmer, Lyne, Gibbs & Clark

[57] ABSTRACT

A cable stranding apparatus wherein back tension on wires drawn from spools thereof and helically wound around a central core is controlled by positive drive means controlling the speed of rotation of each spool about its own axis in a controlled proportion to the speed of rotation of the central shaft of such apparatus about its axis. This controlling of the speed of rotation of each spool about its axis is varied during operation of the apparatus in response to means sensing the back tension on at least one of the spool wires. As a result, the back tension on the wire from the spool controls the speed of spool rotation, and thus frees the wire from the effects of frictional problems at high speeds, and from the effects of variations of outer diameter of the wire on the spool as the wire is progressively unwound from the spool.

21 Claims, 5 Drawing Figures

CABLE STRANDING APPARATUS

BACKGROUND OF THE INVENTION

A widely used form of cable stranding apparatus comprises a hollow shaft through which a core strand is drawn continually while the shaft is rotated to swing several spools of wire around the core strand. The wire from the spools is drawn off and fed helically around the core strand after it emerges from within the hollow rotating shaft. The movement of the central core strand controls the rate of travel of the wire from the spools, and frictional braking action on the spools provides back tension to keep the wires taut, and to prevent the spools from unwinding excessively when the machine as a whole is slowed down. This system is used, for example, to strand aluminum conductor wires around a supporting core of a stronger material, such as steel or a higher strength aluminum alloy. If the conductor wire has enough temper or strengthening alloy to endure relatively high back tension during part of this procedure, it is possible to operate this system on a commercially satisfactory basis. However, it is sometimes desirable to strand relatively weak conductor wires around the core, such as when fully annealed EC aluminum alloy is stranded around a steel core, and, in that case, the conventional system may not work satisfactorily without slowing down and suffering the penalty of reduced output. One aspect of this problem is the fact that the spools of wire have substantial mass, and when these spools are rotated around the central shaft their angular momentum is considerable. This imposes an added load which increases the frictional resistance of the bearings on which the spools are journaled for rotation about their own axes. This increased frictional force increases the tension in the wires being drawn from spools. Also, as the wire from each spool is drawn off, the diameter of the outer winding of wire on the spool decreases, and this has the effect of increasing the tension in the wire for any given amount of frictional resistance of the spool bearings.

SUMMARY

This invention provides an improved cable stranding apparatus of the character mentioned which comprises a rotatable hollow shaft adapted to receive a core strand for movement longitudinally therethrough and a plurality of rotatable spools carried by the shaft, each spool having a strand of wire wound thereon, the strand of wire being adapted to be helically wound on the core strand to define a cable, such as, for example, an electrical conductor cable. The apparatus includes drive means driven by the shaft and operating to rotate each of the spools about its own axis in a controlled proportion to the speed of rotation of the shaft about its axis and such drive means has means for varying the controlled proportion in response to tension in at least one of the strand wires during helical winding thereof to thereby enable the helical winding to be achieved free of high tension of the type ordinarily cause by centrifugal force and the effects of variations in the outer diameter of the strand wire as the wire is progressively unwound from its spool.

Other details, uses, and advantages of this invention will be readily apparent from the exemplary embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENT

Figure 2:
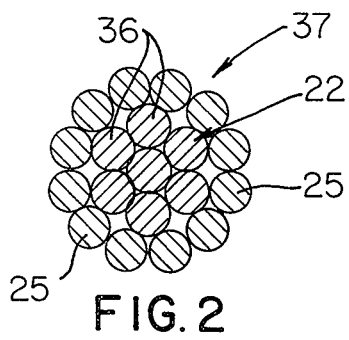
FIG. 2 is a cross-sectional view of a typical cable in the form of an electrical conductor cable made utilizing the apparatus of FIG. 1.
Figure 1:
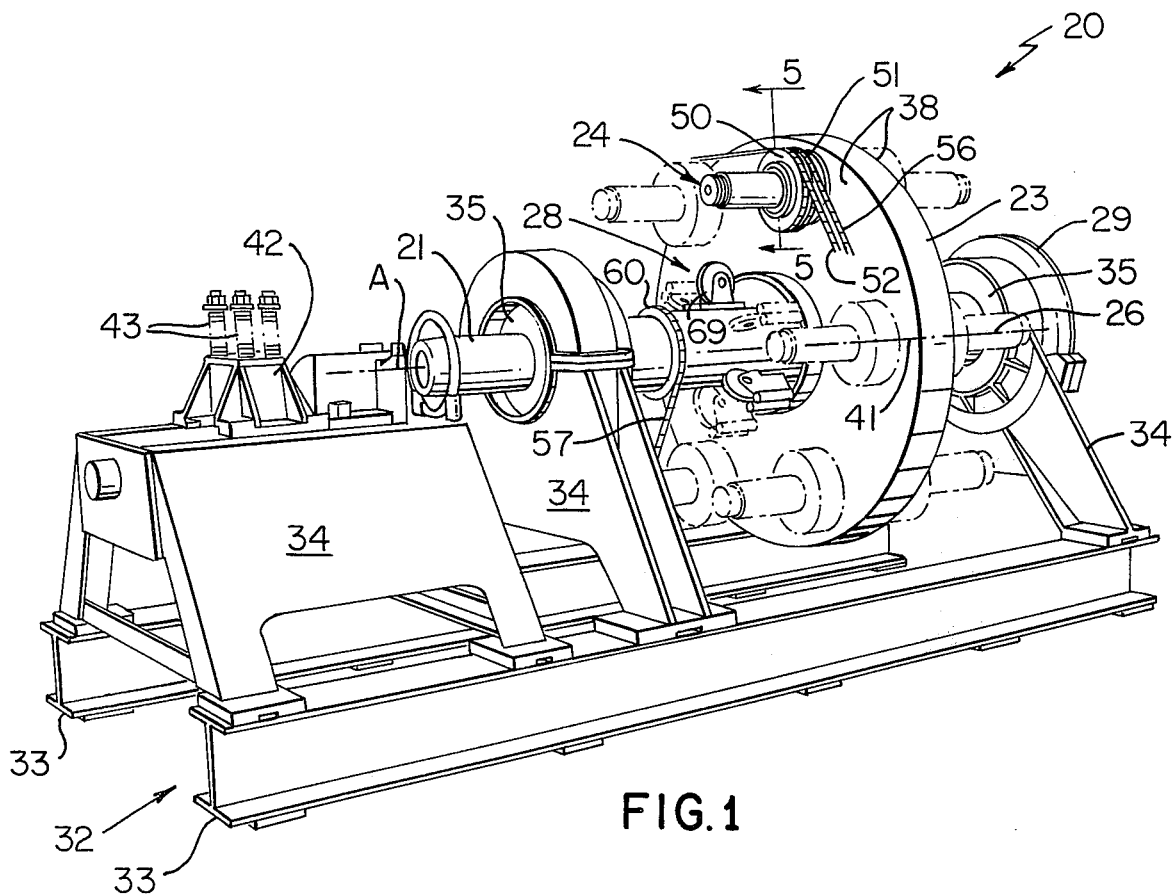
FIG. 1 is a perspective view illustrating one exemplary embodiment of a cable stranding apparatus of this invention.
Figure 4:
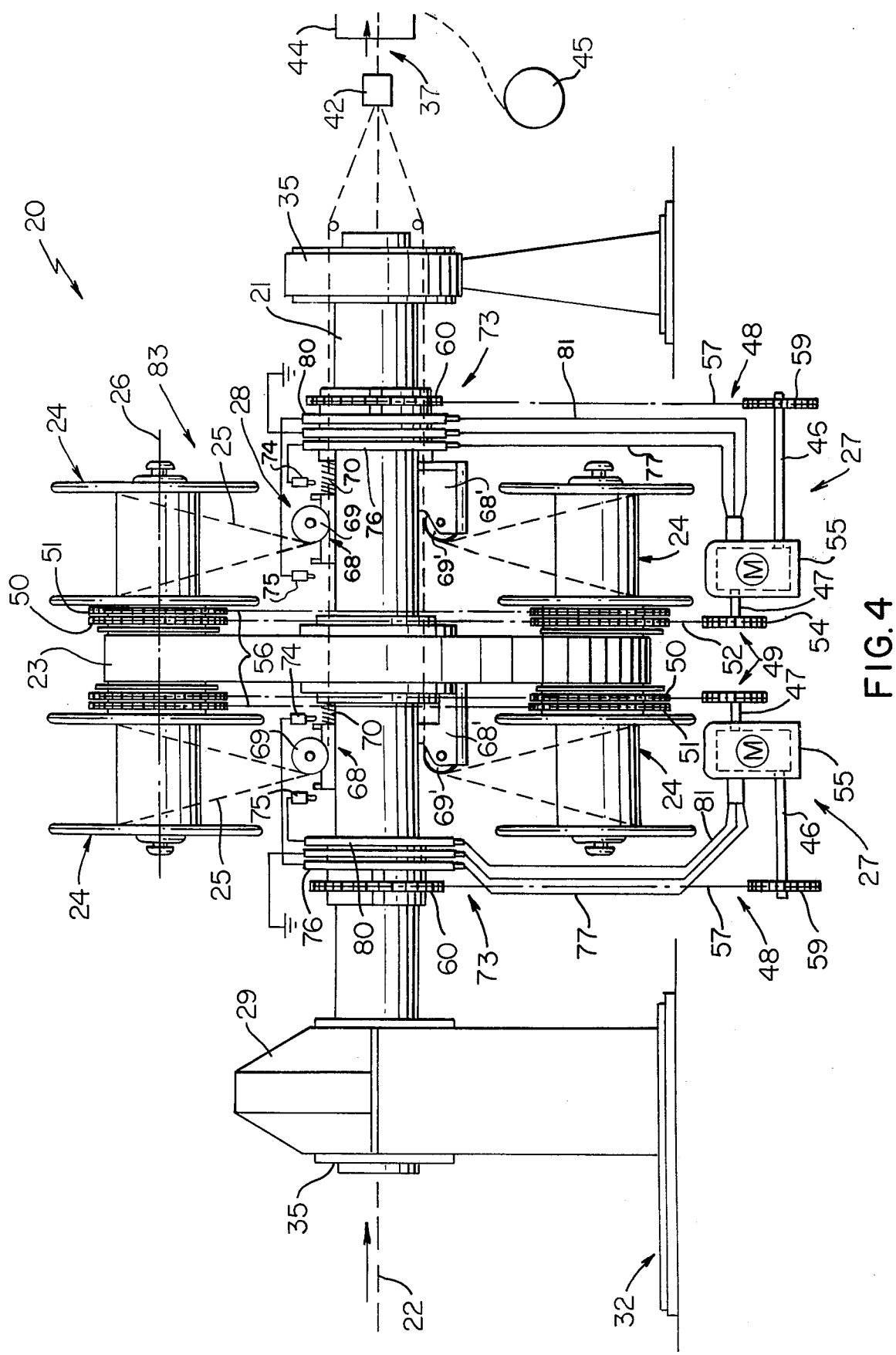
FIG. 4 is a schematic presentation illustrating the operation of the apparatus of FIG. 1 in helically winding a plurality of twelve strand wires against a central core.

Reference is now made to FIGS. 1 and 4 of the drawings, which illustrate one exemplary embodiment of a cable stranding apparatus or machine of the so-called rigid head variety and such apparatus will be referred to hereinafter simply as a cable strander and designated generally by the reference numeral 20. The strander 20 of this example is particularly adapted to wind or strand electrical conductors in the form of a plurality of twelve electrical conductors or strand wires 25, preferably made of an aluminous material, about the central core 22 which, as seen in FIG. 2, is defined by a plurality of seven helically twisted supporting core wires 36, preferably made of steel, to define a composite "electrical" conductor cable designated by the reference numeral 37. (The term electrical conductor for the entire structure 37 is not precise because strictly speaking only the aluminous strand wires 25 are satisfactory electrical conductors. The terminology is in accordance with common practice in the electrical industry, however.)

The strander 20 comprises a rotatable hollow shaft 21 which has a central longitudinal axis A and is adapted to receive a core construction or core 22 for movement longitudinally therethrough. Projecting radially from the shaft is a hollow disc-like portion which will be referred to hereinafter as a flyer 23. The flyer 23 is suitably fixed coaxially on the shaft for rotation therewith. A plurality of twelve spools, each designated generally by the reference numeral 24 are supported on opposite vertical surfaces of the flyer 23 in two sets of six. Each spool 24 is adapted to have, and has, an associated strand wire 25 coiled or wound thereon in accordance with techniques which are well known in the art. The spools 24 are each rotatable about their own respective axis 26 during rotation of the shaft 21 and flyer 23 about their common axis A. The strander 20 has a drive means 29, of any suitable known construction, for rotating the shaft 21 and flyer 23.

The strander 20 has a base 32 which includes a pair of rails 33 and has a frame structure comprised of a plurality of structure 34 which support the hollow shaft 21 on a plurality of two spaced intifruction bearings 35, each bearing being suitably carried on its structure 34 in accordance with techniques which are well known in the art.

As seen in FIG. 1 of the drawings, the flyer 23 has a pair of opposed parallel surfaces 38, each arranged in an associated vertical plane. Six of the 12 spools 24 define a set which extends from one of the surfaces 38 while the opposed six spools 24 define a second set which extends from the other opposed surface 38. The six spools 24 extending from an associated surface 38 are arranged in equal angularly spaced relation about the central longitudinal axis A through the hollow shaft 21. Preferably the twelve spools 24 are further arranged in six opposed pairs, with each pair of spools extending from opposite sides of the flyer and being arranged on a common spool axis 26 which is parallel to the longitudinal axis A of the shaft 21.

The strander 20 utilizes what will be referred to an a closing die means, or a closing die 42 (see FIG. 4), of known construction. The purpose of the closing die is to urge the strand wires 25 tightly against the core 22 during the process of making the cable 37. The die 42 is mounted on a part of the frame structure 34 and, in this example, is a mechanical die structure which employs a plurality of compression springs 43.

To assure proper winding operation of the strander 20, the core 22 is pulled axially through the hollow shaft 21 and closing die 42 by a pullout device of any suitable type, which is designated generally by the reference numeral 44, whereupon the completed cable 37 is coiled around on a takeup reel 45 which is driven by a suitable drive providing enough tension to cause the pullout device 44 to pull the core 22 at a constant rate. With these cooperating components the winding of the strand wires 25 on the core 22 is such that one revolution of the flyer 23 with a set linear movement of the core 22 provides the correct so-called lay or helical angle of the strand wires 25 on the core 22.

Figure 3:
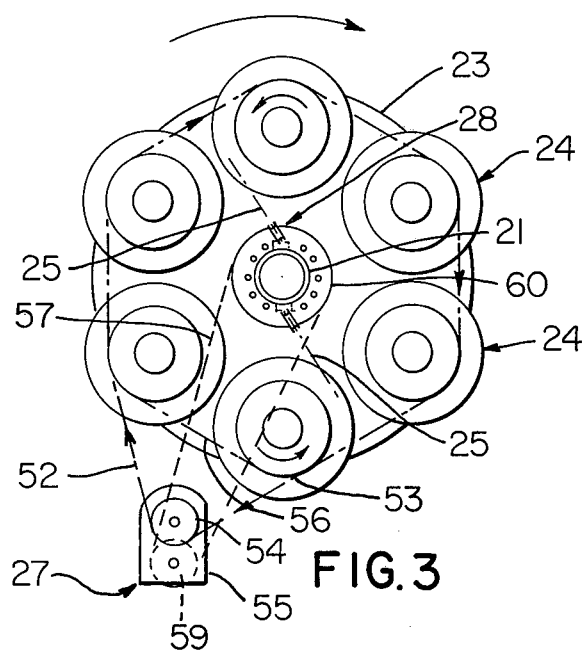
FIG. 3 is a schematic presentation particularly illustrating drive means comprising the apparatus of FIG. 1 and used to rotate strand wire carrying spools which are rotatably supported on a flyer of such apparatus.

The strander 20 also has two drive means 27 (also see FIG. 3) each of which is operatively connected between the drive 29 and spools 24. Each drive means 27 rotates a previously mentioned set of six spools 24 about their axes 26 in a manner simultaneously with the rotation of the shaft 21 and flyer 23. Within each drive means 27 there are integral means 55 for varying the speed of rotation of the spools 24 relative to the speed of rotation of the shaft 21 and flyer 23. The construction and operation of a drive means 27, and associated integral means 55 will be described in detail below.

Each drive means 27, as shown in FIG. 4, comprises integral means 55, having an input drive shaft 46 and an output drive shaft 47, means 48 connecting the input shaft 46 to the main shaft 21 of the strander 20 and means 49 connecting the output shaft 47 to six spools 24. The connecting means 49 comprises a plurality of two sprockets 50 and 51 suitably fixed on each of the six spools 24 and the sprockets 50 have a sprocket chain 52 which meshes with the teeth of the sprockets 50 in a known manner and encircles all six sprockets 50 while leaving at one point, indicated at 53 in FIG. 3, to engage the teeth of a drive sprocket 54 which is fixed to the output shaft 47 of the integral means 55. A second sprocket chain 56 engages the teeth of the sprockets 51 and serves to enhance coupling the six sprockets 51 together as a unit.

Each connecting means 48 comprises a driving sprocket chain 57 which meshes with the teeth of a sprocket 59 fixed to the input shaft 46 and a sprocket 60 fixed to the shaft 21 so that as the shaft 21 is rotated by the machine drive 29 the chain 57 provides the required rotation of shaft 46 and the power required to provide basic rotation of six spools 24.

In this description of the invention the drive means 27 is shown utilizing sprocket chains and related components. However, it will be appreciated that instead of utilizing sprocket chains, endless belt drives may be employed with suitable sheaves. Such belt drives may be ordinary V-belts, or of the type having toothed portions therein with such toothed belts being used with corresponding toothed sheaves, as is well known in the art.

It will also be appreciated that instead of utilizing sprocket chains or belt drives of the type mentioned above, the strander 20 of this invention may utilize a gear drive system to provide rotation of the shaft 21 and rotation of all spools 24 about their axes 26.

Figure 5:
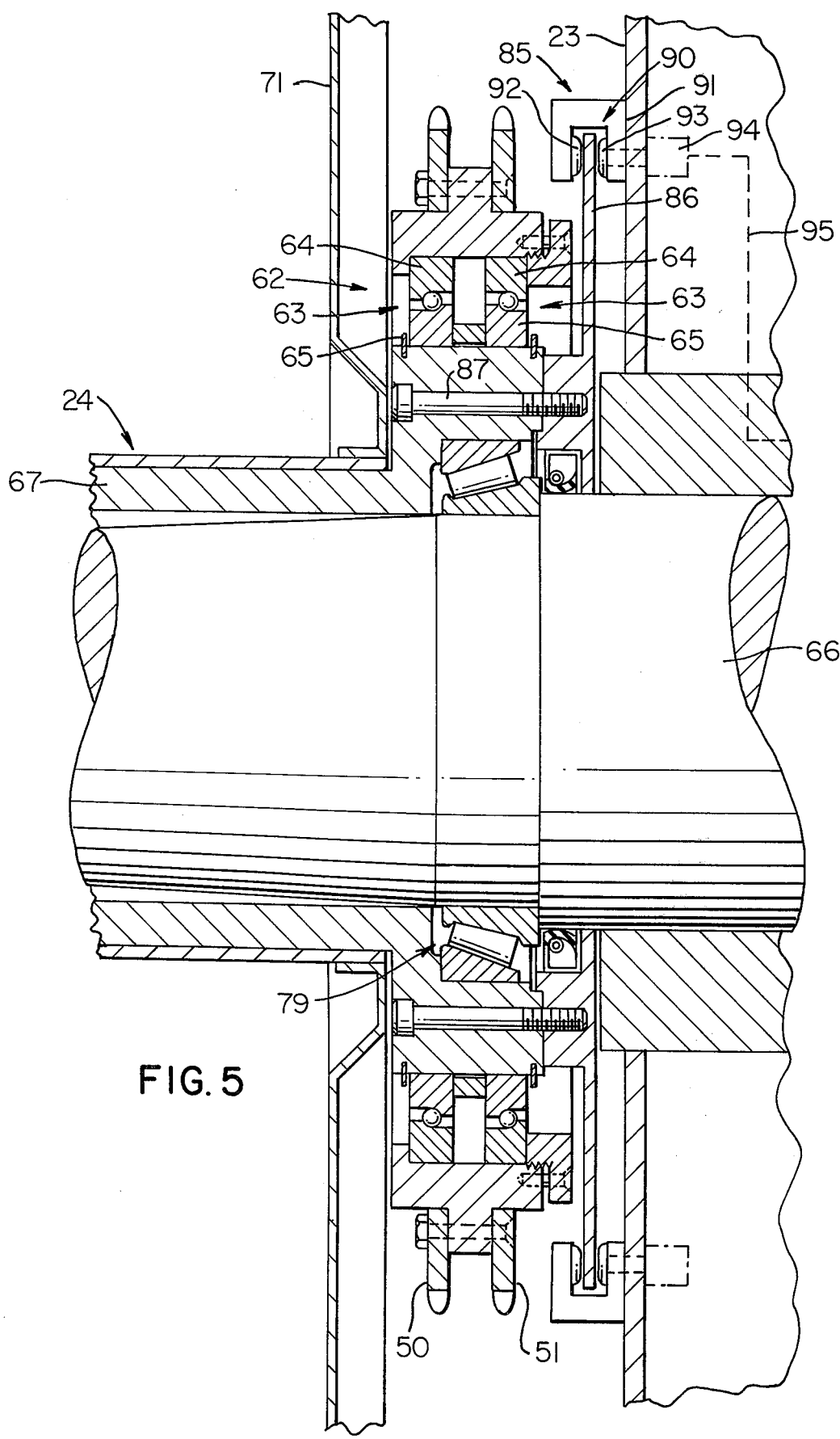
FIG. 5 is an enlarged view taken essentially on the line 5—5 of FIG. 1 with certain parts illustrated in elevation, other parts illustrated in cross section, and still other parts broken away.

During operation of the strander 20 the spools 24 will initially have about the same amount of strand wire 25 thereon and will be unwound at roughly the same rate. However, in actual practice it is very difficult to maintain exactly the same amount of wire on such spools. Thus, if six spools 24 on one side of the flyer 23 are again considered and such six spools were to be coupled together with a solid connection between the sprockets and the spools, theoretically only one spool would be paying off or uncoiling the precise linear footage of strand wire 25 for a given rotational speed of the shaft 21 and the other five spools 24 would either not be uncoiling enough, resulting in excessive tension of the associated strand 25 and possible necking down and breakage thereof, or paying off too much strand wire 25 resulting in a loose conductor strand about the core 22. To correct this situation a unique feature of this invention is the provision on each spool 24 of a self-compensating means in the form of clutch or slip means, designated generally by the reference numeral 62 and illustrated in detail in FIG. 5. The overload slip means 62 comprises preloaded bearing means in the form of a pair of ball bearings 63, shown as single roll annular contact bearings which are preloaded for a predetermined drag during rotation of the outer races 64 thereof relative to the inner races 65.

Each spool 24 has a shaft 66, which is suitably fixed to the flyer 23, and an arbor 67 which is freely rotatable about its shaft 66 on an antifriction roller bearing assembly 79. During operation, the sprocket chains 52 and 56 provide a substantially frictionless rotation of the spools 24 about their shafts 66 while the side flanges 71 of each spool retain an associated strand wire 25 in coiled position.

From the above description it is apparent that the drive 29 rotates the shaft 21 and provides the power for the dirve means 27 which in turn provides the power for the basic rotation of the spools 24 about their axes 26. Further, the design of the strander 20 is such that the sizes of the various sprocket wheels, number of teeth employed, gear ration utilized, drive speeds, etc. are such that the net effect is to produce a rotation of each spool 24 which is slightly faster than would ordinarily be required for perfect coiling or payoff of the strand wire 25. However, the correct payoff or uncoiling of each strand wire 25 is obtainable through the slippage or clutching action provided by the slip means 62.

As previously explained each spool 24 is freely rotatable about its shaft 66 and the free rotation is provided by the anti-friction roller bearing assembly 79. During shutdown of the strander 20 there is a tendency for the spool to overrun and, to prevent this overrunning, each spool 24 has brake means in the form of a disc brake device, which is designated generally by the reference numeral 85 and illustrated in FIG. 5. Each device comprises a brake disc 86 fixed to its rotatable arbor 67 by a threaded bolt 87 whereby the disc 86 is rotatable with the arbor 67 and, hence, its associated spool 24. The brake device 85 includes a caliper-type brake shoe assembly 90 fixed to the flyer 23, as indicated at point 91, which has a fixed friction surface 92 and a surface 93 which is movable toward and away from the surface 92 by an air operated device 94. The air operated device 94 is supplied with air from any suitable pressure source external to the strander 20 through an air conduit indicated schematically by dotted lines 95. The conduit 95 extends along the shaft 21 and is supplied at its inlet with air by a rotary valve mechanism (not shown) of known construction. The rotary valve mechanism is supplied with air under pressure once the flyer 23 is decelerating; any suitable known control which senses flyer deceleration may be employed to control the flow of supply air to the rotary valve mechanism.

The strander 20 has a plurality of tension responsive means or devices 28 each of which is responsive to tension in its associated strand wire 25. In turn, the above mentioned integral means 55 of each drive means 27 is responsive to the related tension responsive devices 28. Thus, for a given speed or rotation of the shaft 21 and the flyer 23, the speed of rotation of the spools 24 will vary according to the tension in the strand wires 25, the effect being to hold the tension within a predetermined range. Accordingly, the strand wires 25 are helically wound on the core 22 with a tension which is controlled within a range which assures tight helical winding of strands 25 yet without high stresses being imposed thereon. A detailed description of a typical device 28 will be made below.

Each tension responsive device 28 comprises a slide assembly 68 which is suitably supported for axial sliding movement along the shaft 21, the slide assembly 68 having a pulley 69 mounted rotatably thereon. The pulley 69 receives a strand wire 25 therearound and such strand wire then passes through an associated opening (not shown) for winding about core 22. The slide assembly 68 includes spring means in the form of a mechanical spring device 70 which, when the tension in the associated strand wire 25 is substantially correct, operates to maintain the slide assembly 68 in a position substantially centered between electrical switches 74 and 75.

The routine operation of the strander 20 commences such that the drive means 27 rotates the spools 24 about their axes in controlled proportion to the speed of rotation of the shaft 21 and its axis A, as previously explained. However, as the tension on any one of the strand wires 25 increases to an excessive point, as determined by the spring design, its slide assembly 68 tends to override the action of its spring device 70, thereby actuating electrical switch means designated generally by the reference numeral 74. Actuation of the switch 74 provides an electrical signal to the integral means 55 and causes the drive means 27 to increase the rotational speed of the spools 24 to provide the desired tension. In the event that the tension in a strand wire 25 is too small, the spring device 70 urges the slide assembly 68 in direction opposite to the direction of slide assembly movement described above, whereby the switch means 75 provides a signal to the integral means to decrease the rotational speed of the spools 24 and thereby increase the tension in the strand wires 25 to the desired level.

The integral means 55 of the drive means 27 may be of any suitable type, such as for example, the type sold by FMC Corporation, Link Belt Enclosed Drive Division, 2045 Hunting Park Avenue, Philadelphia, Pa. 19140 under the designation RS P.I.V. Variable Speed Drive. In the example, the construction comprises two pairs of conical sheaves, with the diverging faces of paired sheaves facing one another so as, in effect, to form a pulley. The two pulleys thus formed are respectively connected to the input and output shafts to the assembly and are together connected by a belt. The distance between paired sheaves is made variable and the two pairs are further related by a mechanism which causes a distance variation between one pair to reflect an opposite distance variation between the other pair. Accordingly, for a given rotation of the input shaft 46 the corresponding rotation of the output shaft 47 can be made to vary by effecting such a distance variation between paired sheaves. To produce the distance variations, there is provided an electric motor M of a type that, when it is actuated by one switch, it operates on the sheaves so as to increase, by a certain increment, the ratio of respective angular movements of the output and input shafts 46 and 47 and, when it is actuated by another switch, it operates so as to decrease said ratio by a certain amount.

It will be appreciated, however, that the above mentioned output to input ratio of the drive assembly 55 may be variable over a much wider range than suggested in the example and that the tension responsive device may be of a type capable of responding to a number of strand tensions. The expected result would be the control of the strand tension within a more narrow range and the ability to use a variety of strand materials with a minimum of modification.

The strander 20 has a plurality of electrical systems 73, each of which comprises a previously mentioned pair of electrical limit switches 74 and 75 which are suitably supported in fixed positions on the flyer 23 for rotation therewith and with their tension responsive device 28. The switch 74 has suitable electrical connections through an electrical ring assembly 76 of a type well known in the art which enables rotation of the associated tension responsive device 28 with the flyer 23 while maintaining electrical contact with fixed electrical lead 77. The lead 77 in turn provides an electrical connection to the integral means 55. The switch 75 has a ring assembly 80 similar to the assembly 76 and a lead 81 similar to the lead 77 with the lead 81 being operatively connected to the integral means 55 for the purpose of actuating the integral means 55 in an opposite manner from actuation provided by ring assembly 76 and 77.

In the presently preferred embodiment of the invention only one tension device 28, together with its associated electrical system 73, is employed per drive 27. Hence in the construction of the apparatus as illustrated, two tension devices 28 would be used. As previously noted, it is possible to have as many such devices as there are spools 24, or a total of twelve in the present case; the risk, however, is that operation might be frustrated by the input to a single drive means 27 of simultaneous conflicting signals from several tension devices 28. The above problem is one which could be overcome by a fine tuning of the apparatus or the introduction of appropriate electrical circuitry. The better solution, however, in terms of complexity and cost, would appear to be the suggested limit on the number of tension devices 28. With respect to each spool 24 which has no associated tension device 28, the slide assembly 68 of the respective rotatable pulley 69 is replaced by a pulley 69' journaled on a mounting 68' which is secured to the shaft 21.

While present exemplary embodiments of this invention, and methods of practicing the same, have been illustrated and described, it will be recognized that this invention may be otherwise variously embodied and practiced within the scope of the following claims.

What is claimed is:

1. A cable stranding apparatus comprising, a rotatable hollow shaft adapted to receive a core for movement longitudinally therethrough, a plurality of rotatable spools carried by said shaft and each having a strand wire wound thereon which is adapted to be helically wound on said core to define a cable, and drive means driven by said shaft and operating to rotate each of said spools about its own axis in a controlled proportion to the speed of rotation of said shaft about its axis, said drive means having means for varying said controlled proportion in response to tension in at least one of said strand wires during helical winding thereof to thereby maintain said tension within a predetermined range.

2. An apparatus as set forth in claim 1 and further comprising a flyer fixed coaxially on said hollow shaft for rotation therewith, said flyer supporting each of said spools for rotation about its own axis during rotation of said shaft.

3. A cable stranding apparatus comprising, a rotatable hollow shaft adapted to receive a core for movement longitudinally therethrough, a flyer fixed coaxially on said shaft and being rotatable therewith, a drive for rotating said shaft and flyer, a plurality of spools supported on said flyer for rotating movement about their own axes during rotation of said flyer and each being adapted to have a strand wire coiled thereon which is adapted to be helically wound around said core, means responsive to tension of at least one of said strand wires, and drive means operatively connected between said drive and spools, said drive means rotating said spools about their axes in a simultaneous manner during rotation of said shaft and flyer and in a controlled proportion to the speed of rotation of said shaft about its axis, said drive means having means varying said controlled proportion based on the tension of said one strand wire as determined by said tension responsive means to enable said strand wire to be helically wound on said core with a predetermined tension.

4. An apparatus as set forth in claim 3 in which said means responsive to tension of said one strand wire comprises means actuating said varying means.

5. An apparatus as set forth in claim 3 in which said means responsive to tension of said one strand wire comprises a mechanical spring device and electrical switch means operatively connected to and actuating said varying means.

6. An apparatus as set forth in claim 3 and further comprising slip means allowing rotation of each spool about its axis at a rotational speed different than the rotation of an adjacent spool about its axis as provided by said drive means.

7. An apparatus as set forth in claim 3 in which said drive means comprises a variable speed drive assembly having an input shaft and an output shaft, means connecting said input shaft to said rotatable hollow shaft, and means connecting said output shaft to said spools.

8. An apparatus as set forth in claim 7 in which each of said connection means comprises sprocket means and associated sprocket chain means.

9. An apparatus as set forth in claim 6 in which said slip means comprises preloaded anti-friction bearing means which provides a predetermined drag during rotation of outer races relative to inner races thereof.

10. An apparatus as set forth in claim 3 and further comprising a brake device for each spool with each brake device serving to restrain its spool from overrunning upon deceleration of said flyer.

11. An apparatus as set forth in claim 10 in which each brake device comprises a brake disc fixed to its associated spool for rotation therewith and a caliper brake shoe operatively associating with each brake disc.

12. An apparatus as set forth in claim 11 in which each caliper brake shoe is in the form of an air-operated caliper brake shoe.

13. An electrical cable stranding apparatus comprising, a rotatable hollow shaft adapted to receive a supporting core made of a comparatively electrically non-conductive material for movement longitudinally therethrough, a flyer fixed cooaxially on said shaft and being rotatable therewith, a drive for rotating said shaft and flyer, a plurality of spools supported on said flyer for rotating movement about their own axes during rotation of said flyer and each being adapted to have a strand wire made of electrically conductive material coiled thereon which is adapted to be helically wound around said core, means responsive to tension of said strand wires, and drive means operatively connected between said drive and spools, said drive means rotating said spools about their axes in a simultaneous manner during rotation of said shaft and flyer and in a controlled proportion to the speed of rotation of said shaft about its axis, said drive means having integral means varying said controlled proportion based on the tension of any one of said strand wires as determined by said tension responsive means to enable said strand wires to be helically wound on said core with a tension within a predetermined range.

14. An apparatus as set forth in claim 13 in which said means responsive to tension of said strand wires comprises means actuating said varying means.

15. An apparatus as set forth in claim 13 in which said means responsive to tension of said strand wires comprises a plurality of tension responsive devices operating in parallel.

16. An apparatus as set forth in claim 15 in which each tension responsive device comprises a slide assembly supported for axial sliding movement along said shaft and being rotatable therewith, each slide assembly having a pulley rotatably mounted thereon with each pulley receiving an associated strand wire therearound, and each slide assembly including spring means which operates to maintain the slide assembly in a substantially centered position when the correct tension is being exerted on its associated strand wire.

17. An apparatus as set forth in claim 16 in which each tension responsive device comprises electrical switch means operatively connected to and serving to actuate said varying means.

18. An apparatus as set forth in claim 17 in which each electrical switch means comprises a pair of electrical limit switches which are suitably supported in fixed positions on said flyer for rotation therewith, said switches being electrically connected through associated rotary electrical assemblies to said varying means of said drive means.

19. An apparatus as set forth in claim 13 and further comprising slip means allowing rotation of each spool about its axis at a rotational speed different than the rotational speed of an adjacent spool about its axis as provided by said drive means.

20. An apparatus as set forth in claim 19 in which said drive means comprises sprocket means fixed to said spools and chain drive means operatively engaging said sprocket means.

21. An apparatus as set forth in claim 13 and further comprising a brake device for each spool with each brake device serving to restrain its spool from overrunning upon deceleration of said flyer and each brake device being in the form of an air operated disc brake device.

* * * * *